United States Patent
Schweizer et al.

[11] 3,895,284
[45] July 15, 1975

[54] APPARATUS FOR DETERMINING THE STATE OF CHARGE OF STORAGE BATTERIES

[75] Inventors: Walter Schweizer, Berlin; Martin-Ulrich Reissland, Gummersbach, both of Germany

[73] Assignee: VDO Adolf Schindling AG, Germany

[22] Filed: July 2, 1974

[21] Appl. No.: 485,141

[30] Foreign Application Priority Data
July 4, 1973  Germany.......................... 2333932

[52] U.S. Cl. .................. 320/48; 320/44; 324/29.5; 324/76; 235/150.51
[51] Int. Cl. .......................................... H01m 45/06
[58] Field of Search ............................. 320/43–45, 320/48; 324/29.5, 76, 76 A; 235/150.51, 183

[56] References Cited
UNITED STATES PATENTS

| | | | |
|---|---|---|---|
| 3,484,681 | 12/1969 | Grady, Jr. et al. | 320/44 UX |
| 3,610,908 | 10/1971 | Karosas | 235/150.51 X |
| 3,727,074 | 4/1973 | Keller et al. | 320/43 X |
| 3,735,234 | 5/1973 | Godard | 320/44 |
| 3,740,636 | 6/1973 | Hogrefe et al. | 320/44 X |

*Primary Examiner*—J. D. Miller
*Assistant Examiner*—Robert J. Hickey
*Attorney, Agent, or Firm*—Otto John Munz

[57] ABSTRACT

An apparatus responsive to the current supplied to and by a storage battery, together with various charge, temperature and discharge rate factors, for calculating and displaying a value of the total charge presently in a storage battery as an accurate prediction based upon factors which affect that charge. The calculations are partially performed on a hybrid analog-digital integrator including entry points for several compensation factors.

10 Claims, 2 Drawing Figures

APPARATUS FOR DETERMINING THE STATE OF CHARGE OF STORAGE BATTERIES

BACKGROUND OF THE INVENTION

1. Field of the Invention

The invention relates to an apparatus for determining the state of charge of storage battery, particularly of the starter battery of a motor vehicle, (as in Class 320, subclass 48) by integrating the battery current with a hybrid integrator (as in Class 235, subclass 151.51). The apparatus comprises a precision resistance inserted in the battery circuit for measuring purposes, an integrating stage receiving the voltage produced by the measuring resistance, and an indicator stage series-connected to the integrating stage.

2. Description of the Prior Art

Especially in starter batteries of motor vehicles, but also in stationary generating plants with storage batteries, it is frequently desirable to know the power of the storage battery still available before the storage battery is completely discharged, in order to avoid damage caused by discharges at low voltage.

To determine the state of charge of storage batteries, areometers are usually employed which are either attached to the storage battery or inserted therein after the removal of a battery closure plug. Apart from the fact that areometers are relatively difficult to read, they present the disadvantage that the reading must take place directly at the location where the storage battery is installed. This location, however, especially in motor vehicles can frequently be reached only under great difficulties. It is also known to use an optical apparatus for the measurement of the acid density of a storage battery, instead of an areometer. In such an optical apparatus, a pencil of light rays radiated by a light source passes through a prism filled with the acid toward several photosensitive receivers. Depending on the density of the acid, the pencil of rays is refracted more or less strongly by the prism and strikes therefore, according to the prevailing index of refraction, a photosensitive receiver associated with this index of refraction. The result of the measurement in this apparatus may be indicated at a place distant from the battery, but the measurement is still relatively inaccurate.

Furthermore, it has already been proposed to determine the state of charge of the storage battery by integration of the battery current. For this purpose, a low-impedance resistance is inserted in the battery current circuit, and an integration stage consisting essentially of an operational amplifier is connected parallel thereto. The output of this integration stage is provided with an indicator. It became obvious that, in the case of long-period integration, which must be carried out in this case, the offset and drift values especially may lead to a considerable adulteration of the measured result, so that such a device is not usable for the present purpose.

U.S. Pat. No. 3,484,681 (Grady et al.) discloses an integration system for long-term use, which does not, however, provide any means to correct for errors which arise because of offset and drift voltages in the integrator. U.S. Pat. No. 3,550,018 (James et al.) discloses an approach which has been taken in another context to make hybrid integrators more accurate.

SUMMARY OF THE INVENTION

The present invention has, as an object, an apparatus for determining the state of charge of a storage battery that operates by integration of the battery current.

Another object is an apparatus which supplies fully satisfactory measuring results while presenting a simple structure. A further object is to provide an apparatus for especially rough conditions of use, such as, in motor vehicles.

DESCRIPTION OF THE PREFERRED EMBODIMENT

Figure 1:
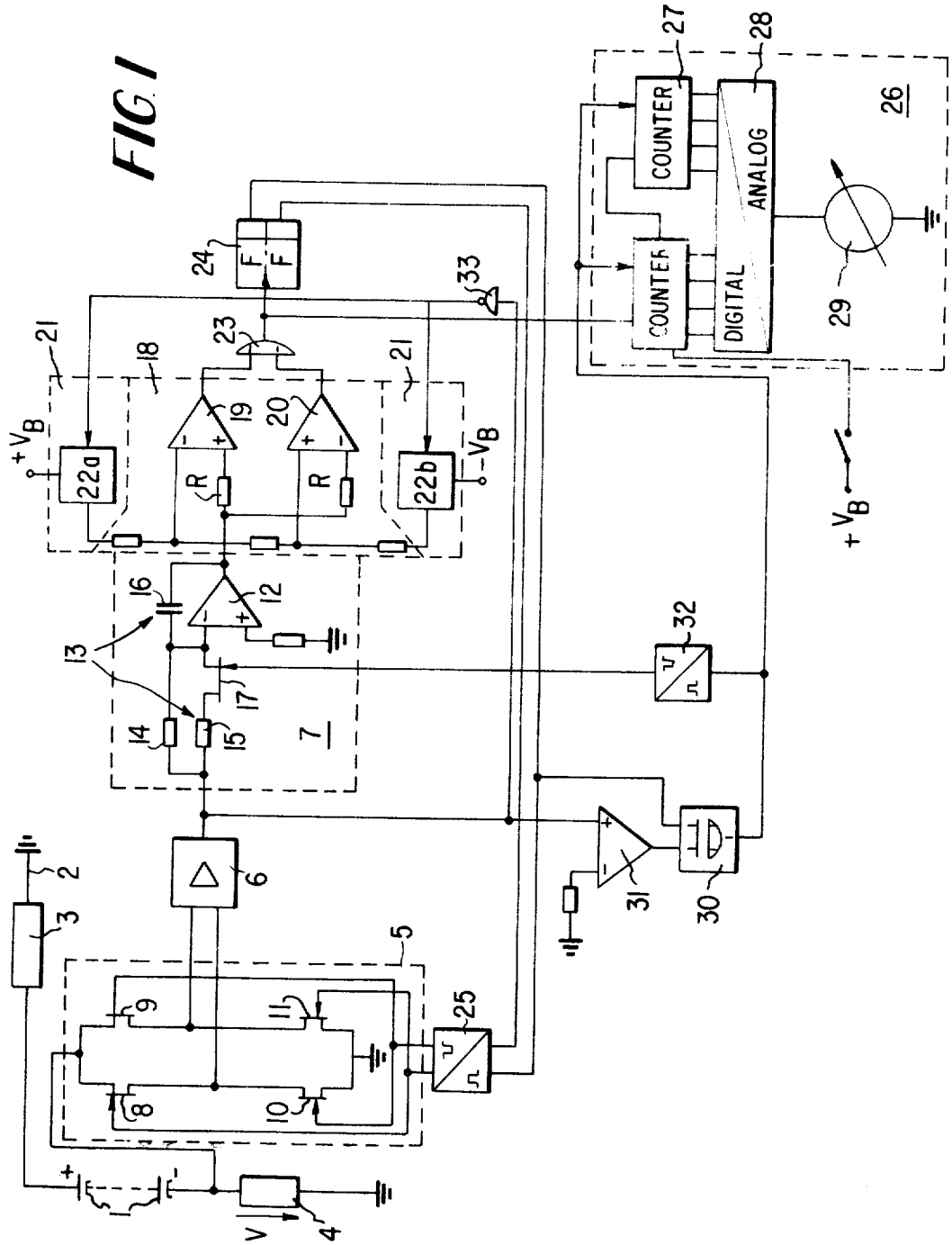
FIG. 1 contains a simplified diagram of an embodiment of the invention.
Figure 2:
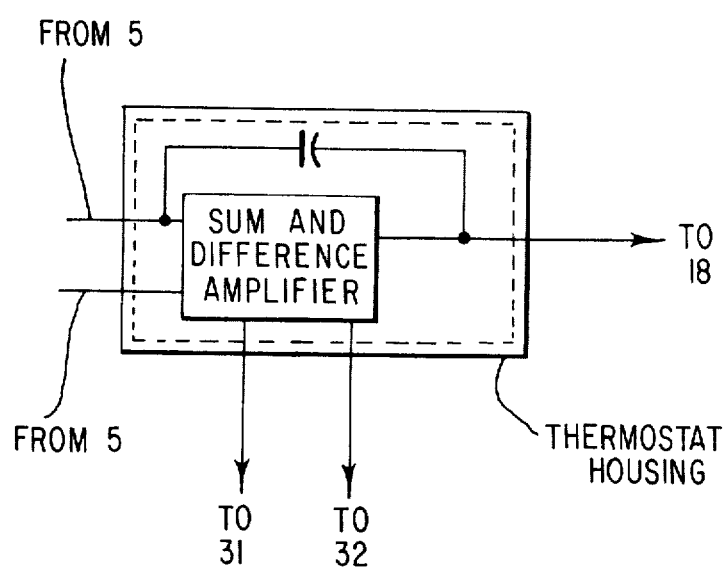
FIG. 2 illustrates an embodiment in which elements 6 and 7 of FIG. 1 are replaced by a sum and difference amplifier in a thermostatic housing.

The objects of the invention are achieved by modification of the apparatus initially mentioned, according to the invention, by providing, between the measuring resistance and the integrating stage, a switch which switches the voltage, as produced by the measuring resistance, alternatingly in a first polarity and then in an opposite polarity to the integrating stage, and by providing a comparator stage series-connected to the integrator stage. Whenever a specific positive or negative value of the integrating stage output signal is reached, the comparator transmits a pulse to the switch and to a meter located in the indicator stage and counting forward and backward, the counting direction being determined by the polarity of the voltage as produced by the measuring resistance.

With these devices of the invention, at one position of the switch the offset and drift potentials of the integrating stage are added to, and at the other position of the switch they are subtracted from, the voltage to be integrated. Since, on the basis of the two constant comparator thresholds, the time period between two subsequent pulses depends on the value of the input voltage applied to the integrating stage, this means that after each second pulse an error based on offset or drift voltage is corrected. Furthermore, voltages produced at the measuring resistance by the switch arranged between measuring resistance and integrating stage and by thermoelectric and electrolytic effects are eliminated, so that an extremely accurate indication can be achieved.

The switch consists most suitably of four barrier-layer field-effect transistors combined as a bridge, of which in each case two field-effect transistors positioned in opposite branches can be simultaneously controlled. Such a switch has an extremely wide transmission range. Such a wide range is very desirable because of the ratio between maximum and minimum battery current. For this reason, use of bipolar transistors for the switch is not practical, since such transistors have a residual collect-emitter voltage of some 10 millivolts, and the smallest occurring input voltage is in the microvolt range. Moreover, use of barrier-layer field-effect transistors of the N-channel type has proved suitable, since the forward resistance thereof, which is a function of the temperature, is smaller between the drain and the source electrode than in a P-channel type and therefore causes a smaller error.

For a further increase in the accuracy of the apparatus, it is advisable to provide a sum-and-difference amplifier between the switch and the integrating stage, in order to amplify the voltages are produced by the measuring resistance to such an extent that they sufficiently exceed the drift and offset values of the integrating stage, which consists essentially of an operational amplifier.

In a preferred embodiment, the integrating stage and the sum-and-difference amplifier series-connected thereto are replaced by an operational amplifier of small drift, provided in a miniature thermostat and operating as difference integrator. Such an embodiment presents the advantage that the drift values can be kept particularly small and the desired ratio between minimum and maximum battery current of 1:10,000 can be easily reached. Also, one less operational amplifier needs to be used.

As is known, the amount of current supplied to a storage battery in the charging process must be greater by the so-called charge factor than the amount of current drawn from the battery during the discharge process, if after a discharge the original state of charge is to be reestablished. This effect can be taken into account, according to a further concept of the invention, by the fact that the integrating stage contains an RC member with at least two resistances, at least one of which can be switched so as to be effective or ineffective in increasing the time constant of the RC member. By this device, the result is achieved that, when a current flows through the measuring resistance during a charging process, pulses appear at the output of the comparator at longer time intervals than when a current of the same intensity flows through the measuring resistance during the discharging process. This, in turn, results in a change of the counting speed of the counter located in the indicator stage, by a specific value which is a function of the time constant of the RC member and corresponds to the charging factor. In other words, during the charging process, the counting speed is smaller by the charge factor than at a current of the same intensity during the discharging process.

A further particularity of the storage battery consists in the dependence of its capacity on the intensity of the discharge current: The greater the discharge current intensity, the smaller the capacity of the storage battery. At an intense discharge current, the storage battery is therefore discharged much more rapidly than at a small discharge current. This property is taken into account, according to a further concept of the invention, by the device of controlling the comparator stage by means of a current evaluation stage which can be efficiently switched during the discharge process and shifts the switching thresholds of the comparator depending upon the prevailing discharge current in correspondence with the capacity-discharge-current characteristic of the storage battery. Another possibility of taking into account the dependence of battery capacity on the discharge current intensity is to generate, for instance, by means of a diode function generator, a voltage associated with the capacity-discharge-characteristic and to transmit this voltage to the sum point of the integrating stage. This embodiment presents, in comparison with the embodiment first described, the disadvantage that a high degree of accuracy of the integrating stage is necessary.

The determination of the prevailing state of operation of the storage battery, i.e., of the charging or discharging operation, can be carried out by measuring the polarity of the voltage produced by the measuring resistance by means of a comparator which contains an operational amplifier. The accuracy of such an embodiment, however, is unsatisfactory on account of the offset and drift values of the operational amplifier. Providing an antivalence gate, also called "exclusive OR" gate, for determination of the operating states is substantially more favorable and accurate. One of the inputs of such antivalence gate is connected to one of the control inputs of the switch, and the other input is connected by way of an operational amplifier acting as comparator to the input of the integrating stage.

The indication of the state of charge can be carried out in analog or digital form, an analog indication being generally preferred on account of the better tendency recognition. An analog indication of the counter contents indicating the prevailing state of charge takes place most suitably series-connecting a digital-analog converter to the counter and connecting to the output of such digital-analog converter an analog indicator.

As is known, the capacity of a storage battery decreases with lower temperature and increases with higher temperature. This temperature-dependence is most suitably taken into consideration by providing between the digital-analog converter and the indicator a multiplying stage which is controlled by a temperature-evaluation signal.

For the determination of the prevailing state of charge of the starter battery 1 of a motor vehicle, a measuring resistance 4 is inserted in a battery cirucit 2 wherein a power-consuming load 3, is mounted. The value of measuring resistance 4 is in the milliohm range.

The voltage V produced by measuring resistance 4 is transmitted, by way of a switch 5 and a sum-and-difference amplifier 6 series-connected thereto, to the input of an integrating stage 7. Switch 5 consists of four barrier-layer field-effect transistors 8, 9, 10 and 11, which are combined to form a bridge. The two field effect transistors 8 and 11 are arranged in opposite branches, and the two transistors 9 and 10 can be in each case jointly controlled. Depending on the control of switch 5, voltage V as produced by measuring resistance 4 appears either at the inverting or non-inverting input of sum-and-difference amplifier 6, and therefore in the polarity imparted to it by the current flow in battery current circuit 2, or in the opposite polarity at the input of integrating stage 7.

Integrating stage 7 consists of an operational amplifier 12 and a RC member 13 which comprises two resistances 14 and 15 and a capacitor 16. Resistance 15 can be switched so as to be effective or uneffective by means of field-effect transistor 17, and thus the time constant of RC member 13 can be switched to two different values.

A comparator stage 18 with two operational amplifiers 19 and 20 is connected to the output of integrating stage 7. The inverting input of operational amplifier 19 is, like the normal input of operating amplifier 20 connected to a specific potential which is determined by the resistances, the supply voltage $+V_B$ or $-V_B$, and a current evaluation stage 21 with the two partial stages 22a and 22b. The other two inputs of operation amplifiers 19 and 20 are connected in each case, by way of a compensating or barrier or series resistance R to the output of integrating stage 7. When consequently the output of integrating stage 7 reaches a positive or negative value which equals the potential at the inverting input of operation amplifier 19 or at the normal input of operation amplifier 20, one of the two operation amplifiers transmits a positively directed pulse which is fed, directly or by way of a Schmitt trigger (not shown) which operates as pulse-forming stage, to an OR gate 23.

From the output of OR gate 23 the pulses pass to a flip-flop 24 and from the two outputs thereof, by way of a regulating converter or level transformer 25, to a switch 5 which is therefore actuated each time and changes the polarity of voltage V at the input of sum-and-difference amplifier 6 when one of the two thresholds of comparator stage 18 is reached. The switch which consists of structural groups 5, 6, 7, 18, 23, 24, and 25 therefore automatically produces pulses whose time interval depends on voltage V, the amplification of sum-and-difference amplifier 6, the time constant of RC member 13 of integrating stage 7, and current evaluation stage 21.

These pulses are fed to an indicating stage 26 which contains a two-stage or multistage binary counter 27. The counter contents may be indicated in a digital or, as in the present embodiment, analog manner. For this purpose, a digital-analog converter 28 is series-connected to binary counter 27, to which digital-analog converter an analog indicator 29 is connected.

The prevailing determination of the counting direction of counter 27, which during the charging operation counts forward and during the discharging operation counts backward, takes place by the determination of the polarity of voltage V produced by measuring resistance 4. This polarity determination is carried out by means of an anti-valence gate 30, one of its inputs being connected to one of the control inputs of switch 5 or volume converter 25, and the other input being connected, by way of an operational amplifier 31 operating as comparator, to the input of integrating stage 7. The output of antivalence gate 30 is connected, not only to counting-direction-shifting inputs of binary counter 27, but also, by way of a volume converter (or level transformer) 32 to field-effect transistor 17. By way of an inverter 33, the current evaluation partial stages 22a and 22b are connected to the output of amplifier 6.

When starter battery 1 is in charging operation, a binary one signal appears at the output of antivalence gate 30, which signal controls field-effect transistor 17 by way of volume converter 32 in its blocking state and thus switches resistance 15 to its ineffective position, whereby the time constant of RC member 13 is increased. This leads to an increase in the time interval between the pulses transmitted by comparator 18 and thus to a decrease in the counting speed of counter 27 by a value that corresponds to the charge factor of starter battery 1. At the same time, the binary ONE signal at the output of antivalence gate 30 produces the result that counter 27 is switched to "forward counting," and the current evaluation stages 22a and 22b to the ineffective position.

When starter battery 1 passes from the charging operation to the discharging operation, the polarity of the voltage reduced at measuring resistance 4 is reversed, with the result that anitvalence gate 30 transmits a binary ZERO signal. By this binary ZERO signal, field-effect transistor 17 is moved, by way of regulating converter 32, into its conductive state, so that resistance 15 is switched into the RC circuit, and the time constant is correspondingly diminished. At the same time, the counter is switched to "backward counting" and the current evaluation partial stages 22a and 22b to the effective position, by the binary ZERO signal. The latter produces the result that a rising discharge current the switching threshold potentials come closer to the reference or zero potential of the comparator stage 18, and thus the number of the pulses transmitted by comparator 18 increases per time unit progressively corresponding to the capacity-discharge current characteristic. Thereby the capacity of the starter battery, which is substantially smaller at high discharge current intensities, is taken into account.

What is claimed is:

1. In a measuring apparatus for use in connection with the charging and discharging circuit of a storage battery to provide an accurate estimate of the state of charge of the battery, comprising:
   A. a precision resistance means situated in the charging and discharging circuit for measuring the current flowing in the circuit and for producing a measured voltage proportional to the current at an output,
   B. an integrator means responsive at an input to the measured voltage for generating an output voltage which is a function of the time-integral of the measured voltage, and
   C. an indicator means connected to receive the output voltage and to provide an indication of its value,
   the improvement comprising:
   D. polarity-inverting switch means connected between the output of the precision resistance means and the input of the integrator means for repetitively switching the polarity of the measured voltage to which the integrator means is responsive,
   E. comparator means responsive to the output voltage from the integrator means for determining when the output voltage reaches a predetermined positive value and for then operating the switch means to apply the measured voltage to the integrator means in a polarity which will cause the output voltage to become more negative, and for determining when the output voltage reaches a predetermined negative value and for then operating the switch means to apply the measured voltage to the integrator means in a polarity which will cause the output voltage to become more positive, and for generating a pulse signal cumulatively indicative of the number of times the switch has been operated to change the polarity, and
   F. counter means responsive to one polarity of the measured voltage for counting forward and to the other polarity of the measured voltage for counting backward, and for thus selectively counting forward or backward said pulse signal,
   whereby the cumulative count in the counter is indicative of the level of charge in the storage battery.

2. Apparatus according to claim 1, wherein the switch means comprises four barrier-layer field-effect transistors combined to form a bridge, two field-effect transistors positioned in two opposite branches of the bridge being in each case simultaneously controllable.

3. Apparatus according claim 2, wherein the barrier-layer field-effect transistors are of the N-channel type.

4. Apparatus according to claim 3, wherein the switch means further comprises a sum-and-difference amplifier connected to receive at its inverting and non-inverting inputs respectively alternately switched signals from two opposite branches of the bridge.

5. Apparatus according to claim 3, wherein the integrating stage comprises a sum-and-difference amplifier means of small drift arranged in a miniature thermostat for operation as difference-integrating device.

6. Apparatus according to claim 1, wherein, in order to adjust the apparatus to take into account the charge factor of the storage battery in deriving the output indication, the integrator means comprises a resistance-capacitance member including at least two resistances and one capacitor, of which at least one resistance can be switched, during the process of charging the capacitor so as to be selectively effective or uneffective with respect to an increase in the time constant of the resistance-capacitance member, the capacitor serving as a storage member in the operation of the integrator means.

7. Apparatus according to claim 1 wherein the comparator means is controlled by a current evaluation means for being efficiently switched during the discharge process and, dependent on the prevailing discharge current, for shifting the switching thresholds of the comparator stage according to the capacity discharge current characteristic of the storage battery.

8. Apparatus according to claim 1 further comprising an exclusive OR gate means for determining the charging or discharging operation of the storage battery one of the inputs of the exclusive OR gate means being connected to one control input of the switch and the other input of the exclusive OR gate being connected, by way of an operational amplifier operating as comparator, to an input of the integrator means.

9. Apparatus according to claim 1 further comprising a digital-to-analog converter series-connected to the counter means for converting the counter contents to an analog value, and an analog indicator connected to an output of the digital-to-analog converter for indicating the analog value.

10. Apparatus according to claim 9, further comprising a multiplying stage interconnected between the digital-to-analog converter and the indicator and controlled by a temperature-evaluating signal for adjusting the analog value with the temperature-evaluating signal.

* * * * *